United States Patent [19]
Gotoh et al.

[11] Patent Number: 5,761,983
[45] Date of Patent: Jun. 9, 1998

[54] OUTPUT SHAFT OF BOOSTER

[75] Inventors: Hiroya Gotoh; Ichirou Sugiyama, both of Saitama-Ken, Japan

[73] Assignee: Jidosha Kiki Co., Ltd., Tokyo, Japan

[21] Appl. No.: 691,213

[22] Filed: Aug. 1, 1996

[30] Foreign Application Priority Data

Aug. 25, 1995 [JP] Japan ................. 7-240788

[51] Int. Cl.$^6$ ................................. F01B 19/00
[52] U.S. Cl. ............ 92/13.2; 92/13.8; 91/369.1; 91/376 R; 411/386
[58] Field of Search ................. 92/13.2, 13.8; 91/369.1, 376 R; 411/386, 412, 413, 427, 429

[56] References Cited

U.S. PATENT DOCUMENTS

| | | | |
|---|---|---|---|
| 3,527,136 | 9/1970 | Wilson | 10/152 |
| 3,628,422 | 12/1971 | Acre . | |
| 3,683,437 | 8/1972 | Larson | 10/10 |
| 4,673,323 | 6/1987 | Russo | 411/387 |
| 4,750,851 | 6/1988 | Thomey | 411/386 |
| 4,818,165 | 4/1989 | Shirai | 411/178 |
| 5,000,639 | 3/1991 | Hinkley et al. | 411/386 |
| 5,046,398 | 9/1991 | Hamamiya et al. . | |
| 5,385,439 | 1/1995 | Hurdle | 411/386 |

FOREIGN PATENT DOCUMENTS 59-20410  5/1984  Japan .

*Primary Examiner*—Thomas E. Denion
*Attorney, Agent, or Firm*—Flynn, Thiel, Boutell & Tanis, P.C.

[57] ABSTRACT

An improvement of an output shaft of a booster is disclosed. An output shaft 23 is formed by a push rod 24 and an adjusting screw 25. The push rod 24 is formed with an axial bore 26 in its distal end, the axial bore including a portion 26b of a reduced diameter which is less than an outer diameter of a threaded section 25C of the adjusting screw. The threaded portion is formed as a self-tapping screw. The adjusting screw includes a guide 25D at a location which is initially inserted into the axial bore before the threaded portion is inserted into the threaded portion. The guide comprises a plurality of annular projections 27 having an outer diameter which is substantially equal to the inner diameter of the axial bore. With this construction, when the guide 25D is fitted into the portion 26b of the axial bore 26 which has a reduced diameter, the axis of the adjusting screw 25 may be brought into alignment with the axis of the push rode 24. Under this condition, the threaded section 25C may be threadably engaged with the inner periphery surface of the axial bore, thus preventing a misalignment of the adjusting screw.

10 Claims, 4 Drawing Sheets

OUTPUT SHAFT OF BOOSTER

FIELD OF THE INVENTION

The invention relates to an output shaft of a booster, and more particularly, to an output shaft comprising a push rod and an adjusting screw which is threadably engaged therewith.

DESCRIPTION OF THE PRIOR ART

Generally an output shaft of a booster comprises a push rod having an axial bore formed in its distal end, and an adjusting screw having threads which are threadably engaged with the axial bore. By adjusting the amount of the threadable engagement between the adjusting screw and the push rod, the axial length of the overall output shaft can be adjusted.

To secure the adjusting screw while it is threadably engaged with the push rod, it has been the prior art practice to form female threads in the axial bore of the push rod while forming a male thread comprising an incomplete thread on the adjusting screw, which is then threadably engaged with the female threads to secure the both integrally together.

In the described arrangement, the need to form female threads in the axial bore of the push rod and to form a male thread on the adjusting screw which comprises an incomplete thread resulted in an increased cost.

To overcome such drawback, it is contemplated to form a thread on the adjusting screw by a self-tapping screw while the inner peripheral surface of the axial bore be formed smoothly to a diameter which is less than the outer diameter of the thread on the adjusting screw so that the self-tapping screw may be threadably engaged with the inner periphery surface of the axial bore. This makes it possible to manufacture the output shaft inexpensively. On the other hand, this involves a risk that the self-tapping screw may be skewed when it is threadably engaged with the axial bore. In such event, the output shaft may drive a piston of a master cylinder along an oblique line of action, resulting in a risk that a smooth braking operation may be impeded.

SUMMARY OF THE INVENTION

In view of the foregoing, the invention provides an output shaft of a booster which enables a reliable threadable engagement between a push rod and an adjusting screw on an aligned axis and which can be manufactured inexpensively.

Specifically, in accordance with the invention, an improvement is applied to an output shaft of a conventional booster in that the inner periphery surface of the axial bore is smoothly formed to a diameter less than the outer diameter of the threads, which are formed as a self-tapping screw. The tapping screw is provided with a guide at a location which is initially inserted into the axial bore before the threads are inserted into the axial bore, the guide comprising a plurality of annular projections having an outer diameter which is substantially equal to the inner diameter of the axial bore, the threads being threadably engaged with the inner periphery surface of the axial bore while the guide is maintained in fitting engagement with the axial bore.

With the construction according to the invention, the guide formed at a distal end of the adjusting screw has an outer diameter which is substantially equal to the inner diameter of the axial bore in the push rod, and accordingly, the axis of the adjusting screw can be brought into alignment with the axis of the push rod by the presence of the guide. While such alignment is maintained, the self-tapping screw can be threadably engaged with the inner periphery surface of the axial bore in the push rod. The plurality of annular projections which form the guide can be utilized in achieving a balance of forces when rolling the adjusting screw, thus allowing the accuracy of rolling the self-tapping screw to be improved.

The above and other objects, features and advantages of the invention will become apparent from the following description of an embodiment thereof with reference to the attached drawings.

DETAILED DESCRIPTION OF THE EMBODIMENT

Figure 1:
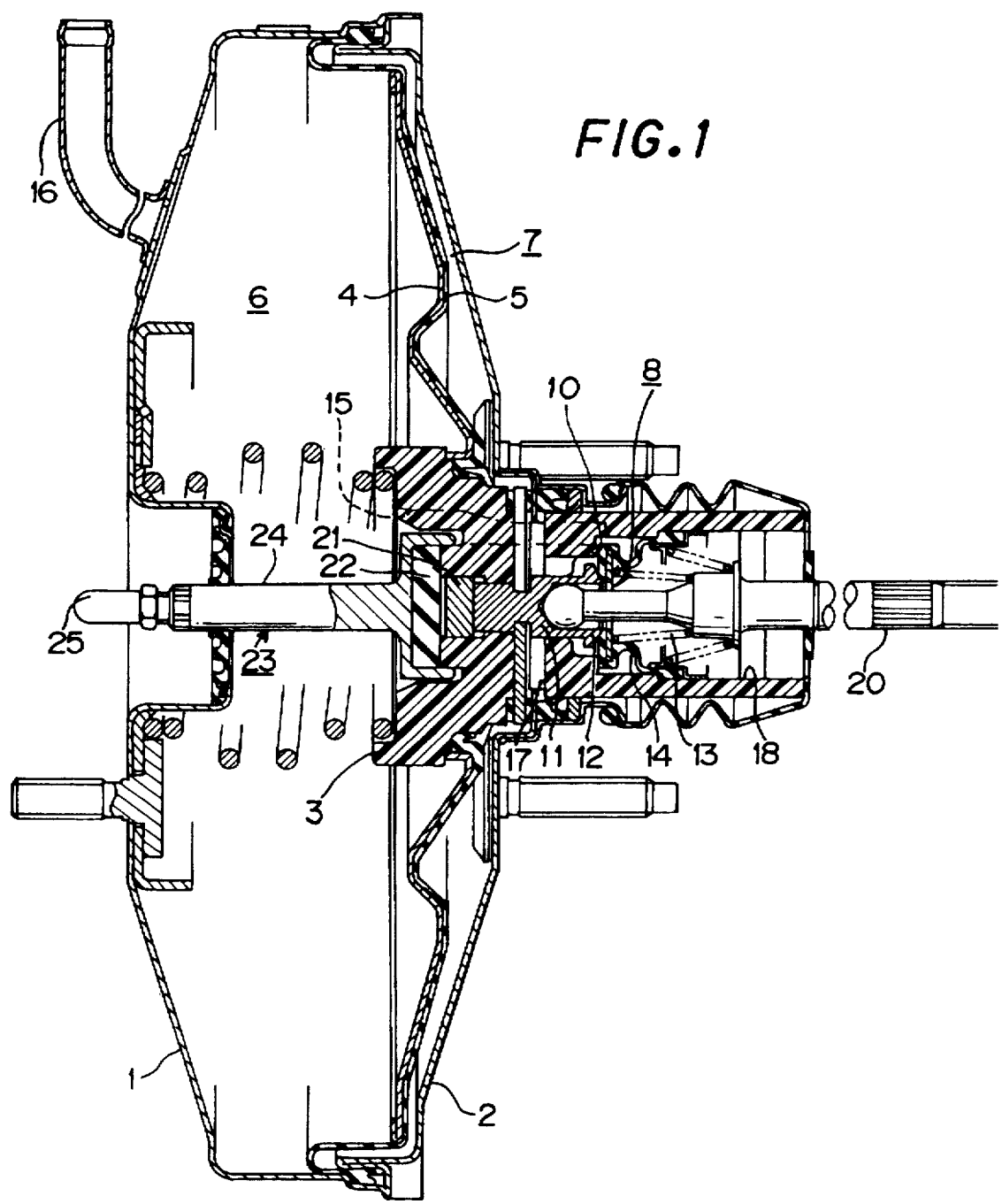
FIG. 1 is a cross section of one embodiment of the invention.

An embodiment of the invention will now be described with reference to the drawings. FIG. 1 shows a general arrangement of a brake booster of single type including an enclosed vessel, formed by a front shell 1 and a rear shell 2, in which an substantially tubular valve body 3 is slidably disposed. A power piston 4 is attached around the outer periphery of the valve body 3, and a diaphragm 5 is applied to the back surface of the power piston, thereby dividing the interior of the enclosed vessel into a forwardly located constant pressure chamber 6 and a rearwardly located variable pressure chamber 7.

The valve body 3 contains a valve mechanism 8 which switches a fluid circuit. Specifically, the valve mechanism 8 comprises an annular, first valve seat 10 formed around the inner periphery of the valve body 3, an annular, second valve seat 12 formed on the right end of a valve plunger 11 which is slidably fitted into the valve body 3, and a valve element 14 which is adapted to be seated upon either valve seat 10 or 12 from the right, as viewed in FIG. 1, under the influence of a spring 13.

A space located radially outward of the first valve seat 10 communicates with the constant pressure chamber 6 through an axial constant pressure passage 15 formed in the valve body 3, and the constant pressure chamber 6 in turn communicates with an intake manifold of an engine through a tubing 16 which is mounted on the front shell 1 for introducing a negative pressure. In this manner, a negative pressure is normally introduced into the constant pressure chamber 6. A space located intermediate the first valve seat 10 and the second valve seat 12 communicates with the variable pressure chamber 7 through a radial valve pressure passage 17 formed in the valve body 3. A space located radially inward of the second valve seat 12 communicates with the atmosphere through a pressure passage 18 formed in the valve body 3.

The right end of the valve plunger 11 is pivotally connected to the distal end of an input shaft 20, the terminal end of which is coupled to a brake pedal, not shown. A plate plunger 21 and a reaction disk 22 are sequentially disposed to the left of the valve plunger 18, and the reaction disk 22 is received in a recess formed in one end of an-output shaft 23 which is slidably disposed in the valve body 3.

The output shaft 23 comprises a push rod 24, and an adjusting screw 25 which is integrally and threadably engaged with the distal end of the push rod 24. The distal end of the output shaft 23 which projects externally of the front shell 1 is connected to a piston of a master cylinder, not shown, which is connected to the front shell 1.

Figure 2:
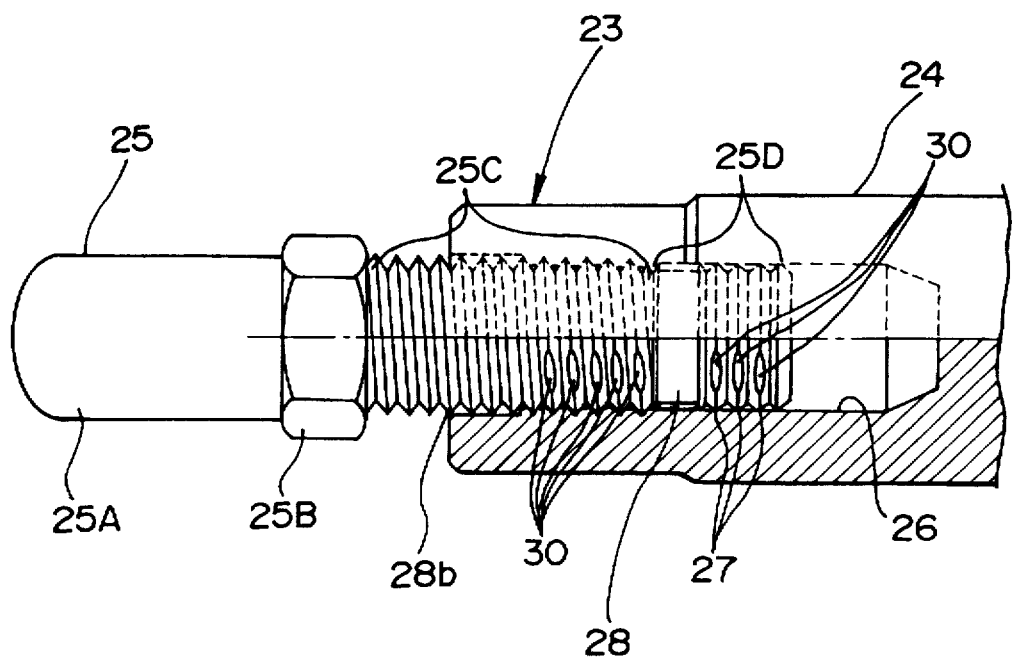
FIG. 2 is an enlarged cross section of part thereof.

FIG. 2 is an enlarged cross section of an inventive part of the output shaft 23. The adjusting screw 25, which forms the output shaft 23, comprises a cylindrical body 25A, a hexagonal section 25B which is utilized to rotate the adjusting screw 25, a threaded section 25C which is adapted to be threadably engaged with the push rod 24, and a guide 25D which serves maintaining the threaded section 25C in axial alignment with the push rod 24 when the screw and push rod are threadably engaged together. The left end face of the body 25A is disposed in abutment against the piston of a master cylinder, not shown.

Figure 4:
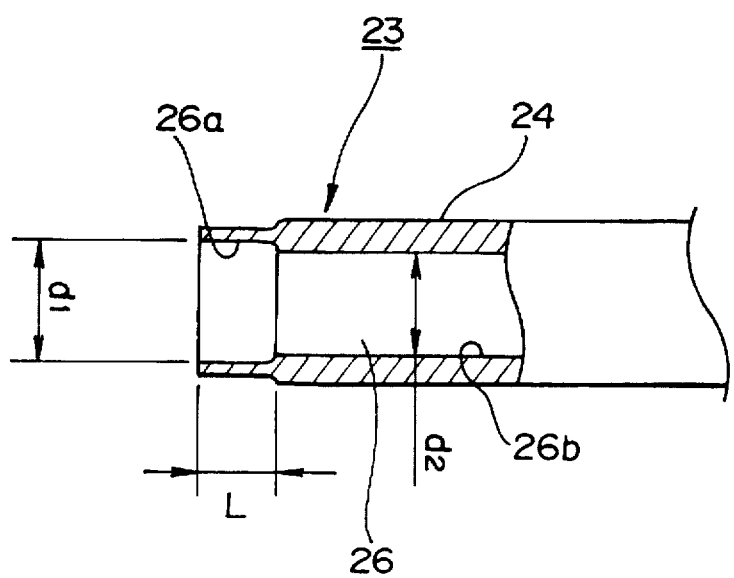
FIG. 4 is a fragmentary cross section of a push rod 24 before an adjusting screw 25 is threadably engaged therewith.

The push rod 24, which also forms the output shaft 23, has a distal end (left end in FIGS. 1, 2, 4, 5) in which an axial bore 26 is formed, into which the threaded section of 25C of the adjusting screw 25 is to be threadably engaged. FIG. 4 shows the status of the axial bore 26 before the threaded section 25C is threadably engaged therewith. As shown, the axial bore includes a portion 26a of an increased diameter or an inner diameter d1 which is slightly greater than the outer diameter of the threaded section 25C and which is disposed at the entrance to the axial bore, and another portion 26b of a reduced diameter or an inner diameter d2 which is less than the outer diameter of the threaded section 25C and which continues from the portion 26a. The portion 26a of an increased diameter has an axial length L which is chosen to be capable of receiving two or three threads of the threaded section 25C.

Figure 3:
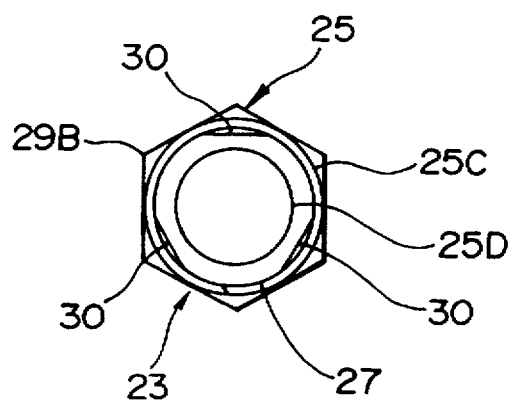
FIG. 3 is a right-hand side elevation of an adjusting screw 25 shown in FIG. 2.

Referring to FIGS. 2 and 3, the threaded section 25C of the adjusting screw 25 is formed as a self-tapping screw having a generally slight conical taper along its right-hand end, or the end which is initially inserted into the axial bore 26 in the push rod 24. In a region located to the right thereof, the guide 25D is provided with a plurality of annular projections 27 having an outer diameter which is less than the outer diameter of the threaded section 25C and which is substantially equal to the inner diameter of the portion 26b of the axial bore 26. In addition, the guide 25D includes a solid cylindrical portion 28 of a reduced diameter or a diameter less than the outer diameter of the annular projections 27, which is located to the left of the annular projections or in a region between the annular projections 27 and the threaded section 25C.

It is to be noted that the threaded section 25C is periphery and partly formed with notches 30 which are disposed at three circumferentially spaced locations in the embodiment shown and which are aligned with each other in the axial direction. In the region of these notches 30, the threaded section 25C is sized to avoid abutment against the inner periphery surface of the portion 26b of the axial bore 26. The purpose of providing the notches 30 is to reduce a friction when the threaded section 25C is threadably engaged with the portion 26b of the axial bore 26.

In the embodiment, the outer periphery of the thread section 25C is partly formed with the notches 30, whereby it is constructed as a self-tapping screw which is non-circular in cross section. However, it should be understood that the construction of the self-tapping screw is not limited thereto, but a self-tapping screw of any suitable cross section and configuration known in the art may be similarly employed. In the present embodiment, the annular projections 27 are also formed with corresponding notches, but the notches 30 in the annular projections 27 may be omitted.

The purpose of the portion 28 of a reduced diameter which is disposed between the annular projections 27 and the threaded section 25C is to secure a full functioning of the guide by increasing the overall length of the guide 25D while preventing an increase in the friction which results from an increased overall length of the guide 25D.

When attaching the adjusting screw 25 with the push rod 24, the guide 25D is initially brought into a close fit into the portion 26b of a reduced diameter formed in the axial bore 26. Under this condition, the presence of the guide 25D allows the axis of the adjusting screw 25 to be brought into alignment with the axis of the push rod 24. Since each annular projection 27 of the guide 25D formes a line contact with the inner periphery surface of the portion 26b having a reduced diameter, the guide 25D can be fitted into the portion 26b with a reduced force.

When the thread section 25C abuts against a step between the portions 26a and 26b of the axial bore 26 which have an increased and a reduced diameter, respectively, the hexagonal section 25B may be utilized to turn the adjusting screw 25 in a given direction, whereupon threads 25c bite into the inner periphery surface of the portion 26b of a reduced diameter for threadable engagement therewith. Subsequently, the degree of threadable engagement of the adjusting screw 25 may be adjusted so that the overall length of the output shaft 23 becomes equal to a proper axial size. Since a misalignment of the adjusting screw 25 is prevented by the guide 25D which is fitted into the portion 26b of a reduced diameter, the adjusting screw 25 can be threadably engaged with the push rod 24 while maintaining an alignment therebetween.

Because the guide 25D is provided with the plurality of annular projections 27 in the adjusting screw 25 as described above, these projections can be utilized in achieving a balance of forces when rolling the adjusting screw 25, thus enabling an improvement of the accuracy of rolling the thread section 25C.

Figure 5:
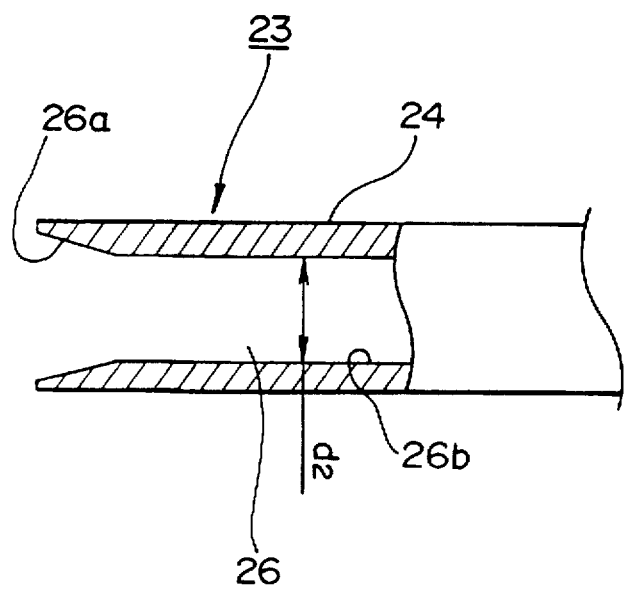
FIG. 5 is a view similar to FIG. 4 but showing the axial bore having a chamfered region.

The portion 26a of the axial bore 26 which has an increased diameter may be omitted, and instead a chamfered region comprising a tapered surface having an increasing diameter to the outside may be formed at the entrance to the axial bore 26 (FIG. 5).

While the invention has been disclosed above with reference to a preferred embodiment, it should be understood that a number of changes, modifications and substitutions therein can be made without departing from the spirit and scoop of the invention defined by the appended claims.

What is claimed is:

1. An output shaft of a booster including a push rod having an axial bore formed in its distal end and an adjusting screw having a threaded portion which is threadably enraged with the axial bore;

the improvement comprising the inner periphery surface of the axial bore being smoothly formed to a diameter which is less than an outer diameter of the threaded portion, and the threaded portion being formed as a self-tapping screw, the adjusting screw having a guide at a location which is initially inserted into the axial bore before the threaded portion is inserted into the axial bore, the guide including a plurality of annular projections each having an outer diameter which is substantially equal to an inner diameter of the axial bore, the threaded portion being threadably engaged with the inner periphery surface of the axial bore while the guide is maintained in fitting engagement with the axial bore, and the plurality of annular projections being each separate from an adjacent annular projection of the plurality of annular projections.

2. An output shaft according to claim 1, in which the guide includes a portion of a reduced diameter than the annular projections and disposed between the plurality of annular projections and the threaded portion.

3. An output shaft according to claim 1 in which the self-tapping screw is non-circular in cross section.

4. An output shaft according to claim 1 wherein an entrance of the axial bore includes an increased diameter portion which is slightly greater than an outer diameter of the threaded portion.

5. An output shaft according to claim 1 wherein an entrance of the axial bore forms, a chamfered portion including by a tapered surface having an increasing diameter to the outside.

6. An output shaft according to claim 4 in which the increased diameter portion of the axial bore has a length which is sufficient to contain two or three threads of the threaded portion.

7. An output shaft according to claim 1 in which the threaded portion is formed with notches which are circumferentially spaced apart and which are aligned with each other in the axial direction, whereby the self-tapping screw is non-circular in cross section.

8. An output shaft including a push rod having an axial bore formed in its distal end, and an adjusting screw having a threaded portion which is threadably engaged with the axial bore;

the improvement comprising the inner periphery surface of the axial bore being smoothly formed to a diameter which is less than an outer diameter of the threaded portion, and the threaded portion being formed as a self-tapping screw, the adjusting screw having a guide at a location which is initially inserted into the axial bore before the threaded portion is inserted into the axial bore, the guide including a plurality of annular projections each having an outer diameter which is substantially equal to an inner diameter of the axial bore, the threaded portion being threadably engaged with the inner periphery surface of the axial bore while the guide is maintained in fitting engagement with the axial bore, and the plurality of annular projections each extending radially outwardly at about a zero degree pitch angle.

9. An output shaft including a push rod having an-axial bore formed in its distal end, and an adjusting screw having a threaded portion which is threadably engaged with the axial bore;

the improvement comprising the inner periphery surface of the axial bore being smoothly formed to a diameter which is less than an outer diameter of the threaded portion, and the threaded portion being formed as a self-tapping screw, the adjusting screw having a guide at a location which is initially inserted into the axial bore before the threaded portion is inserted into the axial bore, the guide including a plurality of annular projections each having an outer diameter which is substantially equal to an inner diameter of the axial bore, the threaded portion being threadably engaged with the inner periphery surface of the axial bore while is the guide is maintained in fitting engagement with the axial bore, and adjacent annular projections being noncontinuous with each other.

10. An output shaft including a push rod having an axial bore formed in its distal end, and an adjusting screw having a threaded portion which is threadably engaged with the axial bore;

the improvement comprising the periphery surface of the axial bore being smoothly formed to a diameter which is less than an outer diameter of the, threaded portion, and the threaded portion being formed as a self-tapping screw, the adjusting screw having a guide at a location which is initially inserted into the axial bore before the threaded portion is inserted into the axial bore, the guide including a plurality of annular projections each having an outer diameter which is substantially equal to an inner diameter of the axial bore, the threaded portion being threadably engaged, with the inner periphery surface of the axial bore while the guide is maintained in fitting engagement with the axial bore, adjacent annular projections being noncontinuous with each other, and each of said plurality of annular projections extending outwardly from said guide portion at about a zero degree pitch angle.

* * * * *

UNITED STATES PATENT AND TRADEMARK OFFICE
CERTIFICATE OF CORRECTION

PATENT NO. : 5,761,983
DATED : June 9, 1998
INVENTOR(S) : Hiroya GOTOH, et al.

It is certified that error appears in the above-identified patent and that said Letters Patent is hereby corrected as shown below:

```
Column 4, line 56; after "distal end" insert ---,---.
          line 57; replace "enraged" with ---engaged---.
Column 5, line 19; delete ",".
          line 20; delete "by".
Column 6, line 5; replace "an-axial"
                    with ---an axial---.
          line 21; delete "is" (first occurrence).
          line 28; after "the" (second occurrence)
                    insert ---inner---.
          line 30; delete "," (first occurrence).
          line 38; delete ",".
```

Signed and Sealed this

Nineteenth Day of January, 1999

Attest:

Attesting Officer

*Acting Commissioner of Patents and Trademarks*